United States Patent Office

Re. 27,279
Reissued Jan. 25, 1972

27,279

DIMER ACID CONTAINING ALKYD RESINOUS COATING COMPOSITIONS AND PROCESS OF PREPARING THE SAME

Ralph E. Layman, Stamford, Conn., assignor to American Cyanamid Company, New York, N.Y.

No Drawing. Original No. 3,158,584, dated Nov. 24, 1964, Ser. No. 74,792, Dec. 9, 1960. Application for reissue July 10, 1970, Ser. No. 53,975
Int. Cl. C08g *17/16;* C09d *3/64*
U.S. Cl. 260—22 D 11 Claims

Matter enclosed in heavy brackets [ ] appears in the original patent but forms no part of this reissue specification; matter printed in italics indicates the additions made by reissue.

*ABSTRACT OF THE DISCLOSURE*

*An alkyd resin composition comprising the esterification reaction product of a phthalic acid, a polyhydric alcohol and a dimer of an ethylenically unsaturated aliphatic monocarboxylic acid having beeween 14 and 22 carbon atoms, wherein said polyhydric alcohol is present at least in part as a glycol in an amount sufficient to constitute at least 65% by weight based on the total weight of polyhydric alcohols present in said reaction product and wherein said dimer acid is present in an amount varying between 10% and 32% by weight based on the total weight of the aforesaid reactants in the composition, said alkyd resin being soluble in an inert organic solvent at room temperature.*

BACKGROUND OF THE INVENTION

This invention relates to a novel alkyd resin composition and to the process of preparing the same. More particularly, this invention relates to a novel alkyd resin composition comprising the reaction of a phthalic acid and a polyhydric alcohol compirsing at least 65% by weight of a glycol based on the total weight of polyhydric alcohol present and a dimer of an unsaturated aliphatic monocarboxylic acid having between 14 and 22 carbon atoms. Still further, this invention relates to blends of the novel alkyd resin composition with aminoplast resins.

One of the objects of the present invention is to produce a novel alkyd resin having utility primarily in the field of coating resins. A further object of the present invention is to produce a novel alkyd resin from a phthalic acid, a polyhydric alcohol and a dimer of an unsaturated aliphatic monocarboxylic acid having between 14 and 22 carbon atoms. These and other objects of the present invention will be discussed in greater detail hereinbelow.

In the preparation of the alkyd resin compositions of the present invention, one will use a phthalic acid. Among the phthalic acids which may be used in the practice of the process of the present invention are: phthalic acid per se, isophthalic acid, terephthalic acid, endomethylene-tetrahydrophthalic acid and halo substituted phthalic acids such as the hexachlorophthalic acid and the like. Whenever available, the anhydrides of these acids may be utilized. Obviously, these acids and/or their anhydrides may be used either singly or in combination with one another. The amount of the phthalic acid to be used will be discussed in greater detail hereinbelow with reference to the amount of dimer acid utilized in light of the amount of polyhydric alcohol utilized.

The second essential component used in the preparation of the novel alkyd resins of the present invention is a polyhydric alcohol. It is essential that the polyhydric alcohol used be a glycol in an amount sufficient to constitute at least 65% by weight based on the total weight of the polyhydric alcohols present in the ultimate alkyd resin produced. One may utilize as much as 100% of a glycol if desired. Preferably one would use between 75% and 80% of a glycol based on the total weight of polyhydric alcohols used in the preparation of the alkyd resins of the present invention. Among the glycols which may be used in the compositions of the present invention are: ethylene glycol, propylene glycol, butylene glycol and the diols such as pentane diol-1,5; hexane diol-1,6; and the like. Additionally one may use diethylene glycol, dipropylene glycol and the like. Obviously, these glycols may be used either singly or in combination with one another or in combination with higher functional polyhydric alcohols such as the trihyric alcohols, tetrahydric alcohols, hexahyric alcohols and the like. Whether the glycols are used singly or in combination with other glycols the requirement of 65% of a glycol used in the composition of the present invention will be calibrated to the total of glycol or glycols when contrasted with the higher functional polyhydric alcohols utilized. Among the higher functional polyhydric alcohols that may be used in combination with the glycols such as those set forth hereinabove are: glycerol, pentaerythritol, dipentaerythritol, sorbitol, trimethylol ethane, trimethylol propane, hexanetriol-1,2,6 and the like. These higher functional polyhydric alcohols may be used singly or in combination with one another when used in combination with glycols such as those set forth hereinabove, but never to an extent greater than about 35% by weight based on the total weight of polyhydric alcohol used. If desired, these higher functional polyhydric alcohols can be eliminated from the composition entirely such as in a case when the glycol or glycols are used exclusively to the exclusion of higher functional polyhydric alcohols. The amount of polyhydric alcohol used in the system will depend upon the amount of the phthalic acid and the dimer acid used in the system. Ordinarily the amount of the polyhydric alcohol used will be that amount which is stiochiometrically calculated to esterify completely or substantially completely esterify all of the carboxyl groups present in the reaction system whether derived from the phthalic acid component or the dimer acid component. Preferably the amount of polyhydric alcohol utilized will be in excess by about 10% or 20% of the amount stiochiometrically calculated to esterify or substantially completely esterify the carboxyl components present in the system.

The third essential component used in the practice of the process of the present invention is one or more dimers of an unsaturated aliphatic monocarboxylic acid having between 14 and 22 carbon atoms. These dimer acids are well known in the art and a plurality of these dimers are available commercially. It will be apparent that these dimer acids are dicarboxylic acids. These dimer acids are derived by conventional procedures by dimerizing such aliphatic monocarboxylic acids as myristoleic, palmitoleic, oleic, linoleic, linolenic, elaeosteric, licanic, ricinoleic, erucic, and the like. Obviously, these dimers may be used either singly or in combination with one another. The preferred dimer acid is the dimer of linoleic acid. The amount of the dimer acid used in the composition of the present invention is fairly critical and should be present in an amount varying between about 10% and 32% and preferably between about 20% and 22% by weight, based on the total weight of the reactants in the composition. It has been mentioned hereinabove that the amount of phthalic acid used in the composition would be discussed in greater detail in the delineation of the amount of dimer acid used in the composition. In light of what has been said immediately hereinabove with respect to the amount of dimer acid to be used in the composition of the present invention and the amount of polyhydric alcohol to be used n the composition, one skilled in the art may readily calculate stiochiometrically the amount of phthalic acid to be used in the composition of the present invention.

In preparing the novel alkyd resins of the present invention, one may introduce the phthalic acid and the polyhydric alcohol composition into a suitable reaction vessel and esterify the reactants in part prior to the addition of the dimer acid. Alternatively, one may introduce the dimer acids and the polyhydric alcohol and esterify these reactants in part with one another prior to the addition of the phthalic acid component. Still further, and preferably, one would introduced all three components, namely, the phthalic acid, the polyhydric alcohol and the dimer acid into the reaction vessel and carry out the esterification reaction by heating the mixture with substantially constant stirring an/or agitation until the desired acid number has been reached. The reaction should be carried out until the esterification has proceeded sufficiently to produce a composition having an acid number below 50 but for preferred purposes the acid number should be reduced to between about 1 and 30. This esterification reaction proceeds with no difficulties under heating and as a consequence no esterification catalyst is necessary although for certain purposes one may elect to utilize such a catalyst.

The alkyd resins of the present invention make excellent coating resins which may be used alone or in combination with aminoplast resins which will be discussed in greater detail hereinbelow or with nitrocellulose lacquers. When used alone or with aminoplast resins, the novel alkyd resins of the present invention may be cut with an appropriate solvent such as an inert organic solvent. Among the inert organic solvents that may be used as solvent medium for the novel resins of the present invention are: benzene, toluene, xylene, or Solvesso No. 100 or No. 150, butanol, methylisobutyl ketone, butyl acetate and the like. The amount of solvent utilized with the novel resins of the present invention is not critical and proportions conventionally used in the art may be observed depending upon the ultimate mode of use of the coating compositions of the present invention. These compositions may be applied by brushing, roller coating, spraying, knife coating, hot melt and the like. For certain applications no diluting solvent medium is necessary such as in the case of hot melt adhesives. Quite obviously, if one wants a clear coating, no additives such as dyes or pigments will be added. On the other hand, if one wishes a colored coating composition the selected dye and/or pigment may be added according to choice in conventional quantities.

In the preparation of the alkyd resins of the present invention, one would heat the reactants at an elevated temperature such as between about 190° C. and 250° C. until the desired acid number has been reached as discussed hereinabove. Preferably one woul utilize temperatures varying between about 215° C. and 235° C.

The alkyd resins of the present invention, when blended with aminoplast resins in certain proportions, produce coating compositions which are capable of producing films that possess a combination of properties not previously known in any coating composition. These outstanding properties are to be noted particularly in the area of impact resistance and hardness. The impact resistance of the films produced by the blend of the alkyd resins of the present invention with aminoplast resins or resin forming compositions, particularly the polymethyl ethers of polymethylol melamines, is so surprisingly excellent that it is possible through the use of this novel coating composition to coat sheet steel with these coatings and upon drying, such as by baking, the coated steel sheet can then be fabricated into desired contours without any display of cracking or peeling which would normally be experienced even with conventional commercially available alkyd coating compositions currently on the market. This outstandingly advantageous property would permit (1) the coating of metal sheets such as sheet steel to be utilized in the manufacture of household appliances such as refrigerators, stoves, washing machines and the like and (2) the postforming of the coated sheet to the desired shape and configuration. Still further, the coating compositions of the present invention could be utilized in metal sheets that are to be fabricated into automotive body parts such as fenders, hoods and the like. Additionally, a further advantage associated with the compositions of the present invention resides in the fact that an automotive body part, coated with the alkyd-amino resin composition of the present invention could experience accidental denting without displaying cracking or peeling of the coating on the metal. When such a dent were to be suffered, on an automotive body part, such as a fender, the same could be hammered out to substantially original form without need for a recoating except possibly in extreme cases when the damage was so great as to render such an approach not possible.

The aminoplast resins used with the alkyd resins of the present invention are well known in the art as is the term used to identify them. Among the aminoplast resins which may be utilized in combination with the novel alkyd resins of the present invention are those resinous materials prepared by reacting an aldehyde such as formaldehyde with a compound such as urea, thiourea, dicyandiamide or the aminotriazines such as melamine, benzoguanamine, acetoguanamine, formoguanamine, and the like. The mol ratios of the aldehyde to the amino compound are all well known in the art depending on the particular amine selected and it is not deemed necessary therefore to elaborate further on details that are well known in the art. These amine-aldehyde resins or potentially resin forming materials may be alkylated or unalkylated. The alkylated aminoplast resins are those which have been reacted with a monohydric aliphatic alcohol such as methanol, ethanol, propanol, butanol and the like. The degree of alkylation may also be varied significantly as is well known in the art and further elaboration of this concept is also deemed to be unnecessary. The preferred aminoplast materials used in the composition of the present invention are the polymethyl ethers of polymethylol melamines including the dimethyl ether of dimethylol melamine, tetramethyl ether or tetramethylol melamine and particularly preferred is the hexamethyl ether of hexamethylol melamine. It should be noted that these polymethyl ethers of polymethylol melamine may be resinous or nonresinous as used in the coating compositions of the present invention. If these materials are nonresinous no significant condensation has taken place and therefore these materials are in a sense monomeric in form but are unquestionably potentially resin forming materials, i.e., these materials are capable of being converted into resinous materials upon use such as heat, i.e., baking. The amount of aminoplast material used in the composition of the present invention may be varied to some extent but not over a very substantial range. The amount of aminoplast material should be limited within the range of about 5% to 30% by weight based on the total weight of aminoplast material and alkyd resin. Preferably, the aminoplast material should be varied between about 15% and 25% by weight based on the total weight of the aminoplast material and the alkyd resin. The compositions of the present invention can be modified further by the addition to the alkyd resin-aminoplast composition, varying proportions of nitrocellulose lacquers, epoxy resins, polyvinyl chloride resins and the like.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitble reaction vessel equipped with thermometer, stirrer, reflux condenser and inert gas inlet and outlet tubes, there is introduced 129 parts of phthalic anhydride, 284 parts of isophthalic acid, 124 parts of ethylene glycol, 152 parts of propylene glycol and 113 parts of the dimer of linoleic acid. The charge is heated with constant stirring to a temperature of about 220–225° C. and held at about that temperature while removing the water of esterification by a stream of nitrogen gas bubbling through the reactants in the reaction vessel. The heating is continued until an acid number 2.2 is reached. Thereupon the resin is cut with enough xylene to provide a 75% solids solution which has a viscosity of 15 poises at 25° C.; the alkyd resin solution thus produced is clear and sparkling.

Example 2

Example 1 is repeated in all details with respect to processing steps except that the reactants charged to the vessel are as follows: 388 parts of phthalic anhydride, 124 parts ethylene glycol, 114 parts propylene glycol, 40 parts of trimethylol ethane and 113 parts of the dimer of linoleic acid. The reaction is continued until an acid number of 3.0 is reached. The alkyd resin produced is cut in xylene to give a 75% solids solution having a viscosity of 17 poises at 25° C.

Example 3

Example 1 is repeated in every detail with respect to the processing steps except that the reactants charged to the vessel are as follows: 185 parts of phthalic anhydride, 228 parts of isophthalic acid, 186 parts of ethylene glycol, 80 parts of trimethylol ethane and 113 parts of the dimer of linoleic acid. The reaction is continued until an acid number of 5.0 is reached. Thereupon the resin is cut with xylene to give a 70% solids solution having a viscosity of 23 poises at 25° C.

Example 4

Example 1 is repeated in all details with respect to the processing steps except that the following reactants are used: 185 parts of phthalic anhydride, 288 parts of isophthalic acid, 109 parts of ethylene glycol, 114 parts of propylene glycol, 40 parts of trimethylol ethane and 113 parts of the dimer of linoleic acid. The reaction is continued until an acid number of 1.0 is reached. The alkyd resin is then cut with xylene to give a 75% solids solution having a viscosity of 36 poises at 25° C.

Comparative Example 5

Example 1 is again repeated in all details with respect to the processing steps except that the following reactants were utilized: 388 parts of phthalic anhydride, 265 parts of glycerin and 265 parts of lauric acid. The charge is heated until an acid number of 5 is reached. A viscous material results which when cut with xylene to a 60% solids solution still displays a viscosity of 46 poises at 25° C.

Each of the alkyd resins of Examples 1–5 inclusive were mixed with a xylene solution of the hexamethyl ether of hexamethylol melamine so as to produce a composition which has, on a nonvolatile basis, the proportion of 80% solids of alkyd resin to 20% solids of the melamine compound. White baking enamels were prepared from each of these samples by grinding titanium dioxide into the solution so as to have equal weights of titanium dioxide and total resin solids (including the melamine compound). To the resultant coating composition there is added 1% of para toluene sulfonic acid by weight based on the total weight of the melamine compound present. Each of the five enamels thus prepared were reduced to spray consistency by adding xylene and in each instance the coatings were applied to 30 gauge tinned-steel panels. After baking each panel for 30 minutes in an oven at a temperature of 300° F., all of the panels are smooth and glossy. Each of the baked film panels were then subjected to a standard impact test and the back impact values expressed as inch/pounds, of these enamels were as follows: Example 1—>28, Example 2—14, Example 3—10, Example 4—20 and Example 5—<2. In these tests the impact head was a hemisphere ½ in. in diameter. Each of these five panels were further tested with respect to the xylene resistance by a conventional softening test. The results of the test were as follows: 1—10′, Example 2—60′, Example 3—24 hours, Example 4—20′, and Example 5—3′.

Example 6

Into a suitable reaction vessel equipped as in Example 1, there is introduced 185 parts of phthalic anhydride, 197 parts of isophthalic acid, 171 parts of ethylene glycol, 32 parts of glycerin and 187 parts of the dimer of linoleic acid. The procedure of Example 1 is followed until the alkyd resin has an acid number of 6. Thereupon the resin is cut with xylene to yield a solution having a 70% resin solids. The viscosity of the solution is 64 poises at 25° C.

Example 7

Into a suitable reaction vessel equipped as in Example 1, there is introduced 185 parts of phthalic anhydride, 196 parts of isophthalic acid, 8 parts of fumaric acid, 109 parts of ethylene glycol, 90 parts of butanediol-1,3,32 parts of glycerin and 150 parts of the dimer of linoleic acid. The procedure of Example 1 is followed until the resin has an acid number of 5. The resin is then cut with xylene to a resin solids solution of 70% which has a viscosity of 98 poises at 25° C.

Example 8

Example 1 is followed in all details except that the ingredients charged are as follows: 148 parts of phthalic anhydride, 67 parts of ethylene glycol, 35 parts of pentaerythritol and 120 parts of the dimer of linoleic acid. The procedure of Example 1 is followed until the resin has an acid number of 15. The resin is then cut with xylene to a solids content of 60%. The viscosity of the resin solution is 64 poises at 25° C.

Example 9

The procedure of Example 1 is repeated using the following ingredients: 355 parts of phthalic anhydride, 11 parts of fumaric acid, 210 parts of propylene glycol-1,2, 32 parts glycerin and 150 parts of the dimer of linoleic acid. The procedure of Example 1 is continued until the resin has an acid number of 6. The resin is cut with xylene to a 70% solids solution. The viscosity of the resin solution is 95 poises at 25° C.

A portion of each of the resins prepared according to Examples 6–9 inclusive is blended with a xylene solution of hexamethyl ether of hexamethylol melamine in proportions sufficient to provide 80% alkyd resin solids to 20% hexamethyl ether of hexamethylol melamine solids. White baking enamels are prepared, as in the earlier examples, by grinding titanium dioxide into the resin solutions so as to have equal weights of titanium dioxide to the total of the alkyd resin and the melamine compound. One percent of para toluene sulfonic acid by weight based on the weight of the melamine compound is added. The enamels are reduced by further dilution with xylene to spray consistency and applied as before to 30 gauge tinned-steel panels. These enamels were baked at 300–350° F. for 30 minutes in order to give hard, tough, glossy films having impact values greater than 28 in./pounds and possessing high resistance to attack by aliphatic solvents, acetic acid and dilute sodium hydroxide. After the baked coatings of Examples 6–9 inclusive had aged for several months, adhesion to the steel panel was still excellent whereas the enamel made from Example 5 exhibited very poor adhesion as determined by a conventional scratch test.

Although it is preferred to utilize pure dimer acids of the unsaturated aliphatic acids containing between 14 and 22 carbon atoms it may become necessary, because of commercial availability and for economic reasons, to utilize dimer acid compositions of the class described hereinabove which contain "impurities" in the nature of small percentages of monomers of these same acids or trimers of these same acids. The monomer content in commercially available dimer acid compositions is generally quite small, such as in the order of magnitude of 2% to 4% by weight based on the total weight of the dimer acid composition. The trimer acid content, in the commercially available dimer acid compositions, is generally more sizeable such as in the order of magnitude of 20% to 25% by weight based on the total weight of the dimer acid composition. The dimer acid per se in the dimer acid composition is present in preponderant amounts such as about 73% to about 76% by weight based on the total weight of the dimer acid composition. For the purposes of the present invention, the trimer acid is considered to be a polyfunctional acid, as is the dimer acid, and when proportions are calculated for use in the compositions of the present invention, the amount of dimer acid composition used should be calculated as though the dimer composition was in fact pure dimer acid.

Example 10

Into a suitable reaction vessel equipped as in Example 1, there is introduced 185 parts of phthalic anhydride, 97 parts of isophthalic acid, 133 parts of propylene glycol, 62 parts of ethylene glycol, 40 parts of trimethylol ethane and 187 parts of the dimer of linoleic acid. The procedure of Example 1 is followed until the acid number of the alkyd resin reaches 4.0. The resin is then cut with xylene to a solids content of 70%. The viscosity is 98 poises at 25° C.

Example 11

Into a suitable reaction vessel equipped as in Example 1, there is introduced 370 parts of phthalic anhydride, 7 parts of propylene glycol, 108 parts of ethylene glycol, 10 parts of trimethylol ethane and 150 parts of the dimer of linoleic acid. The procedure is continued, as before, until an acid number of 5 is reached. The alkyd resin is then cut with xylene to a 70% solids solution. The viscosity is 64 poises at 25° C.

Each of the resins in Examples 10 and 11 is blended with 20% of the hexamethyl ether of hexamethylol melamine by weight based on the total alkyd resin solids and melamine compound. The composition is catalyzed with 1% para toluene sulfonic acid based on melamine compound solids.

Comparative Example 12

A commercially available alkyd resin is prepared according to the process of Example 1 except that the following reactants are charged to the vessel: 360 parts of phthalic anhydride, 7.4 parts of fumaric acid, 252 parts of glycerine and 304 parts soya oil fatty acids. The reactants are heated according to the process of Example 1 until an acid number of 5 is reached. The alkyd resin is then cut with xylene to a 55% solids solution having a viscosity of 35 poises at 25° C. This commercially available alkyd resin is then blended with 20% hexamethyl ether of hexamethylol melamine and 1% of para toluene sulfonic acid is added as in Examples 10 and 11. Each of these three resin solutions were then separately converted into white baking enamels and films therefrom were separately drawn down on 24 gauge aluminum panels. Each panel was baked for 30 minutes at 300° F. Each of these enamels was then subjected to various tests. The enamels of Examples 10 and 11 withstood >80 in./pounds impact, from the back, using a ⅝ in. diameter instrument whereas the enamel of comparative Example 12 withstood only 10 in./pounds. This comparison of the concept of the present invention, considered in light of a commercially available coating enamel, is all the more striking in view of the fact that the comparative alkyd resin contained 33% of fatty acid modification against only 20% and 23.3% of the dimer acid modification in Examples 10 and 11 respectively. Additionally, the dimer acid alkyd enamels of Examples 10 and 11 had better color, better gloss and very much better hardness. The Sward hardness of the enamels of Examples 10 and 11 is 60% whereas the Sward hardness for the enamel of Example 12 was only 44%.

The alkyd resins of the present invention may be used with or without benefit of any catalyst as may be the combination of the alkyd resin of the present invention and the aminoplast material. However, in order to achieve more complete cure in shorter periods of time, in a baking operation, it is frequently desirable to add small conventional quantities of a catalytic material such as an acid catalyst of which a greater plurality are known in the art. The acidic catalysts are preferred and may be used in combination with amines such as those disclosed in the U.S. Pat. No. 2,750,355 particularly if a latent catalyst is desired. For most purposes, however, the acidic catalyst may be used alone. The preferred acidic catalyst is para toluene sulfonic acid.

I claim:

1. An alkyd resin composition comprising the esterification reaction product of a phthalic acid, a polyhydric alcohol and a dimer of an ethylenically unsaturated aliphatic monocarboxylic acid having between 14 and 22 carbon atoms, wherein said polyhydric alcohol is present at least in part as a glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition, *said alkyd resin being soluble in an inert organic solvent at 25° C.*

2. An alkyd resin composition comprising the esterification reaction product of phthalic anhydride, a polyhydric alcohol and a dimer of an ethylenically unsaturated aliphatic monocarboxylic acid having between 14 and 22 carbon atoms, wherein said polyhydric alcohol is present at least in part as ethylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition.

3. An alkyd resin composition comprising the esterification reaction product of phthalic anhydride, a polyhydric alcohol and a dimer of an ethylenically unsaturated aliphatic monocarboxylic acid having between 14 and 22 carbon atoms, wherein said polyhydric alcohol is present at least in part as propylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition.

4. An alkyd resin composition comprising the esterification reaction product of phthalic anhydride, a polyhydric alcohol and a dimer of an ethylenically unsaturated aliphatic monocarboxylic acid having between 14 and 22 carbon atoms, wherein said polyhydric alcohol is present at least in part as butylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition.

5. An alkyd resin composition comprising the esterification reaction product of phthalic anhydride, a polyhydric alcohol and a dimer of linoleic acid, wherein said polyhydric alcohol is present at least in part as ethylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the compositions.

6. An alkyd resin composition comprising the esterification reaction product of phthalic anhydride, a polyhydric alcohol and a dimer of linoleic acid, wherein said polyhydric alcohol is present at least in part as propylene glycol in an amount sufficient to constitute at least 65% by weight based on the total weight of polyhydric alcohols present in said reaction product and wherein said dimer is present in an amount varying between about 10% and 32% by weight based on the total weight of the aforesaid reactants in the composition.

7. An alkyd resin composition comprising the esterification reaction product of phthalic anhydride, a polyhydric alcohol and a dimer of linoleic acid, wherein said polyhydric alcohol is present at least in part as butylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition.

8. A process for the preparation of an alkyd resin composition comprising esterifying a phthalic acid, a polyhydric alcohol and a dimer of an ethylenically unsaturated aliphatic monocarboxylic acid having between 14 and 22 carbon atoms, wherein said polyhydric alcohol is present at least in part as a glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition, *said alkyd resin being soluble in an inert organic solvent at 25° C.*

9. A process for the preparation of an alkyd resin composition comprising esterifying a phthalic acid, a polyhydric alcohol and a dimer of linoleic acid, wherein said polyhydric alcohol is present at least in part as ethylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition, *said alkyd resin being soluble in an inert organic solvent at 25° C.*

10. A process for the preparation of an alkyd resin composition comprising esterifying a phthalic acid, a polyhydric alcohol and a dimer of linoleic acid, wherein said polyhydric alcohol is present at least in part as propylene glycol in an amount sufficient to constitute at least 65% by weight based on the total weight of polyhydric alcohols present in said reaction product and wherein said dimer is present in an amount varying between about 10% and 32% by weight based on the total weight of the aforesaid reactants in the composition, *said alkyd resin being soluble in an inert organic solvent at 25° C.*

11. A process for the preparation of an alkyd resin composition comprising esterifying a phthalic acid, a polyhydric alcohol and a dimer of linoleic acid, wherein said polyhydric alcohol is present at least in part as butylene glycol in an amount sufficient to constitute at least 65% by weight based on the total weight of polyhydric alcohols present in said reaction product and wherein said dimer acid is present in an amount varying between about 10% and 32% by weight based on the total weight of the aforesaid reactants in the composition, *said alkyd resin being soluble in an inert organic solvent at 25° C.*

References Cited

The following references, cited by the Examiner, are of record in the patented file of this patent or the original patent.

UNITED STATES PATENTS

| | | | |
|---|---|---|---|
| 1,890,668 | 12/1932 | Bradley | 260—75 |
| 3,057,824 | 10/1962 | Le Bras et al. | 260—75 |
| 3,068,254 | 12/1962 | Le Bras et al. | 260—407 |
| 3,106,537 | 10/1963 | Simon et al. | 260—2.5 |
| 3,235,520 | 2/1966 | Crowell | 260—22 |
| 1,799,420 | 4/1931 | Holton | 260—22 |
| 2,111,427 | 3/1938 | Kittredge | 260—22 |
| 2,429,219 | 10/1947 | Cowan et al. | 260—22 |
| 2,663,649 | 12/1953 | Winkler | 260—18 |
| 2,860,119 | 11/1958 | Petropoulos et al. | 260—75 |
| 2,954,354 | 9/1960 | Young | 260—22 |
| 2,957,836 | 10/1960 | Culbertson et al. | 260—21 |
| 2,973,331 | 2/1961 | Kraft | 260—22 |

OTHER REFERENCES

Ellis, Chemistry of Synthetic Resins, Reinhold, 1935, pp. 897 and 898.

Emery, catalog dated 1950, p. 7.

DONALD E. CZAJA, Primary Examiner

R. W. GRIFFIN, Assistant Examiner

U.S. Cl. X.R.

117—132 B, 161 K; 260—16, 21, 31.2 XA, 32.8 R, 33.4 R, 33.6 R, 75 R